(12) United States Patent
Lin et al.

(10) Patent No.: US 12,531,016 B2
(45) Date of Patent: Jan. 20, 2026

(54) IMAGE PROCESSING CIRCUIT AND METHOD

(71) Applicant: NOVATEK Microelectronics Corp., Hsin-Chu (TW)

(72) Inventors: Xuan-Yong Lin, Hsinchu (TW); Shang-Yu Su, Hsinchu County (TW); Feng-Ting Pai, Hsinchu (TW)

(73) Assignee: NOVATEK Microelectronics Corp., Hsin-Chu (TW)

( * ) Notice: Subject to any disclaimer, the term of this patent is extended or adjusted under 35 U.S.C. 154(b) by 200 days.

(21) Appl. No.: 18/235,891

(22) Filed: Aug. 21, 2023

(65) Prior Publication Data
US 2024/0078969 A1    Mar. 7, 2024

Related U.S. Application Data

(60) Provisional application No. 63/403,793, filed on Sep. 5, 2022.

(51) Int. Cl.
*G06T 3/40*          (2024.01)
*G06T 5/50*          (2006.01)
(Continued)

(52) U.S. Cl.
CPC .............. *G09G 3/3208* (2013.01); *G06T 3/40* (2013.01); *G06T 5/50* (2013.01); *G09G 3/2007* (2013.01); *G09G 2320/0257* (2013.01); *G09G 2340/02* (2013.01); *G09G 2340/16* (2013.01); *G09G 2360/12* (2013.01); *G09G 2360/16* (2013.01)

(58) Field of Classification Search
None
See application file for complete search history.

(56) References Cited

U.S. PATENT DOCUMENTS

| | | | | |
|---|---|---|---|---|
| 2012/0050263 | A1* | 3/2012 | Kang | H04N 13/398 |
| | | | | 345/419 |
| 2013/0094754 | A1* | 4/2013 | Lee | G09G 5/003 |
| | | | | 382/167 |

(Continued)

FOREIGN PATENT DOCUMENTS

| | | |
|---|---|---|
| EP | 2 339 859 A2 | 6/2011 |
| TW | 200921614 | 5/2009 |

(Continued)

*Primary Examiner* — Yanna Wu
(74) *Attorney, Agent, or Firm* — Winston Hsu

(57) ABSTRACT

An image processing circuit includes a receiver, at least one memory, a recognition circuit, a calculation circuit and a compensation circuit. The receiver is configured to receive a current image frame and a plurality of previous image frames. The at least one memory is configured to store the plurality of previous image frames. The recognition circuit is configured to select a first previous image frame or a second previous image frame among the plurality of previous image frames from the at least one memory. The calculation circuit is configured to calculate a compensation value for the current image frame according to at least one of the first previous image frame and the second previous image frame by referring to a lookup table (LUT). The compensation circuit is configured to modify a current image data of the current image frame by using the compensation value.

26 Claims, 15 Drawing Sheets

(51) Int. Cl.
  *G09G 3/20* (2006.01)
  *G09G 3/3208* (2016.01)

(56) References Cited

U.S. PATENT DOCUMENTS

| | | | | |
|---|---|---|---|---|
| 2014/0071143 | A1* | 3/2014 | Wang | H04N 19/85 345/98 |
| 2015/0206467 | A1* | 7/2015 | Choi | G09G 5/003 345/55 |
| 2019/0266428 | A1 | 8/2019 | Karsh | |

FOREIGN PATENT DOCUMENTS

| | | | |
|---|---|---|---|
| TW | 201023152 | A1 | 6/2010 |
| TW | 201040881 | A1 | 11/2010 |

* cited by examiner

IMAGE PROCESSING CIRCUIT AND METHOD

CROSS REFERENCE TO RELATED APPLICATIONS

This application claims the benefit of U.S. Provisional Application No. 63/403,793, filed on Sep. 5, 2022. The content of the application is incorporated herein by reference.

BACKGROUND OF THE INVENTION

1. Field of the Invention

The present invention relates to an image processing circuit and method, and more particularly, to an image processing circuit and method for a display panel.

2. Description of the Prior Art

Image sticking (also known as image retention or ghost image) easily appears on an organic light emitting diode (OLED) panel when the image content changes, especially when there is a larger variation on the grayscale values. For example, when the image changes from a lower grayscale to a higher grayscale with an extremely large voltage variation, the luminance may not exactly reach the target level corresponding to the higher grayscale in several consecutive image frames. In the prior art, an OLED panel may be driven by allocating three phases: initial phase, compensation phase and emission phase. The OLED pixels may include more control switches which are switched between different phases, to eliminate the mismatch of the OLEDs and/or driving thin-film transistors (TFTs) in the OLED pixels, so as to compensate for the luminance drop. However, this internal compensation scheme needs a larger number of TFTs in each pixel, resulting in a lower transmittance, lower pixel density, and lower production yield.

Since the luminance drop cannot be well compensated, the image sticking left on the OLED panel may degrade the images. For example, a square block dragged on the panel may appear as a rectangle due to the image sticking effects. Moreover, the OLED pixels in different colors may possess image sticking indifferent degrees, which further results in a color cast. In addition, in an exemplary application, the emission of an OLED panel is used for optical fingerprint sensing. The luminance drop in multiple image frames may reduce the sensitivity of fingerprint sensing, thereby increasing the sensing time and reducing the user experience.

SUMMARY OF THE INVENTION

It is therefore an objective of the present invention to provide an image processing circuit and method for a display panel such as the organic light emitting diode (OLED) panel, in order to solve the abovementioned problems.

An embodiment of the present invention discloses an image processing circuit, which comprises a receiver, at least one memory, a recognition circuit, a calculation circuit and a compensation circuit. The receiver is configured to receive a current image frame and a plurality of previous image frames. The at least one memory, coupled to the receiver, is configured to store the plurality of previous image frames. The recognition circuit, coupled to the at least one memory, is configured to select a first previous image frame or a second previous image frame among the plurality of previous image frames from the at least one memory. The calculation circuit, coupled to the recognition circuit, is configured to calculate a compensation value for the current image frame according to at least one of the first previous image frame and the second previous image frame by referring to a lookup table (LUT). The compensation circuit, coupled to the calculation circuit, is configured to modify a current image data of the current image frame by using the compensation value.

Another embodiment of the present invention discloses an image processing method, which comprises steps of: receiving a current image frame and a plurality of previous image frames; storing the plurality of previous image frames in at least one memory; selecting a first previous image frame or a second previous image frame among the plurality of previous image frames from the at least one memory; calculating a compensation value for the current image frame according to at least one of the first previous image frame and the second previous image frame by referring to a lookup table (LUT); and determining whether to modify a current image data of the current image frame by using the compensation value.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
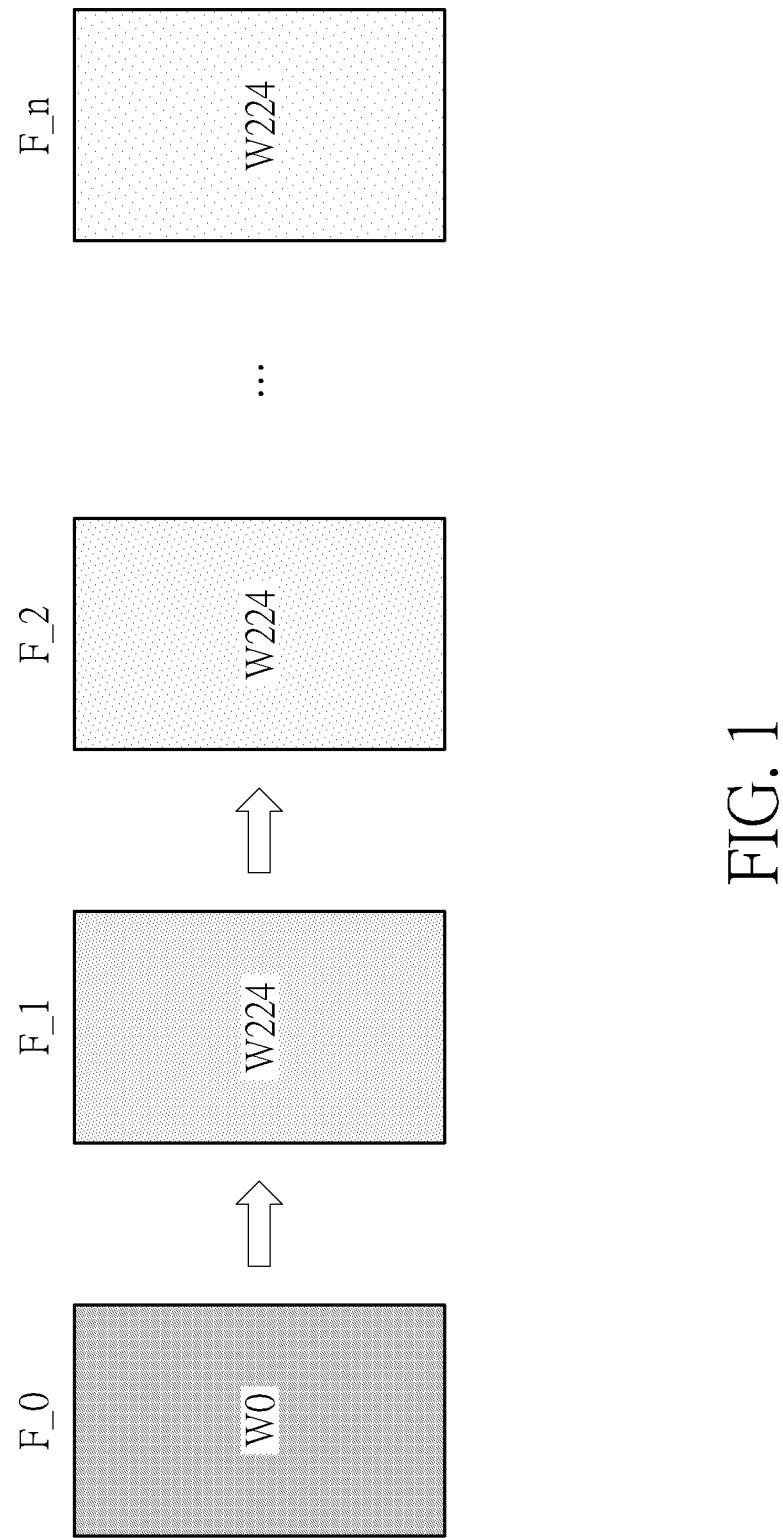
FIG. 1 illustrates a series of image frames having different grayscale values.

FIG. 1 illustrates a series of image frames having different grayscale values. As shown in FIG. 1, the grayscale is W0 in frame F_0, changes to a higher level W224 in frame F_1, and keeps at W224 from frame F_1 to frame F_n, where n may be an integer greater than or equal to 3, and the grayscale W0 may be the minimum grayscale value and the grayscale W224 may be close to or equal to the maximum grayscale value.

In this case, it is requested that the image shown on the frames F_1-F_n having the same grayscale W244 should reach the same luminance, but the luminance fails to reach its target level until the frame F_n, and thus needs to be compensated. As mentioned above, the conventional internal compensation uses a larger number of thin-film transistors (TFTs) in the pixels, which is accompanied by several side effects such as lower transmittance, lower pixel density, and lower production yield. In addition to the internal compensation, an external compensation with overdriving technique may be applied to compensate for the luminance drop, but the conventional external compensation can only compensate for the luminance of only one image frame after the grayscale changes.

In the case of FIG. 1, the grayscale changes from the frame F_0 to F_1, and thus the conventional external compensation may be performed on the frame F_1. However, as can be seen in FIG. 1, the frames F_2, F_3 . . . also have luminance drop to some extent.

Figure 2:
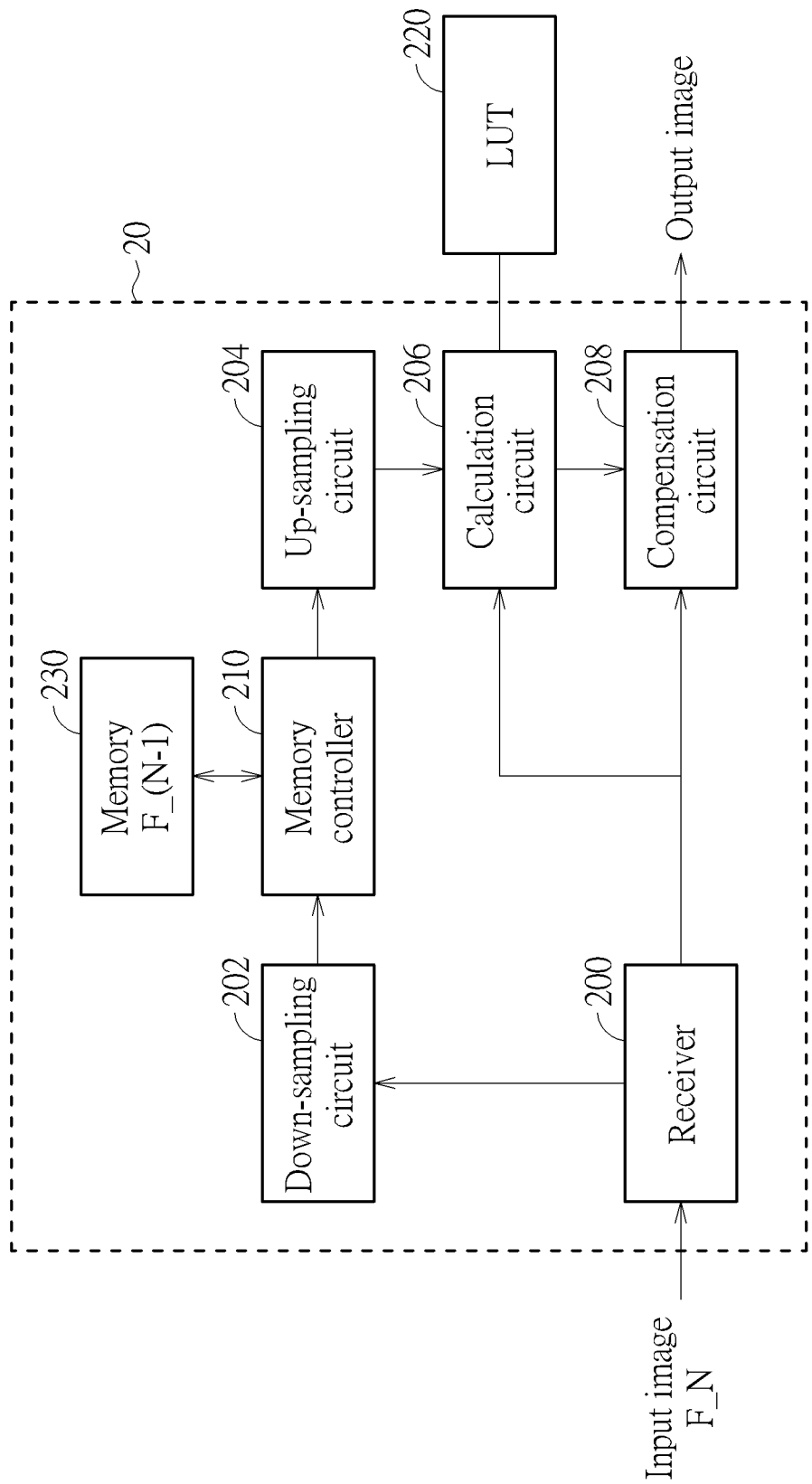
FIG. 2 is a schematic diagram of an image processing circuit.

FIG. 2 is a schematic diagram of an image processing circuit 20, which includes a receiver 200, a down-sampling circuit 202, an up-sampling circuit 204, a calculation circuit 206, a compensation circuit 208 and a memory controller 210.

The receiver 200 is configured to receive a plurality of image frames, which include a current image frame (abbreviated as current frame hereinafter) F_N and a previous image frame (abbreviated as previous frame hereinafter) F_(N−1).

The down-sampling circuit 202 is configured to compress the received image frames (or may keep the original frame data without compression) to be stored in the memory 230. In general, the image processing circuit 20 might not have a large frame buffer to record an entire frame data, and thus image compression should be performed before the data storage. For example, the down-sampling circuit 202 may convert the image data of each frame into compressed data including the image features, and thus the image data may be stored into the memory 230 (e.g., through the memory controller 210). In this embodiment, the down-sampling circuit 202 may compress the previous frame F_(N−1) before the previous frame F_(N−1) is stored in the memory 230.

The up-sampling circuit 204 is configured to decompress the image data stored in the memory 230 to restore the frame data. In this embodiment, the up-sampling circuit 204 may decompress the previous frame F_(N−1) when the previous frame F_(N−1) is obtained from the memory 230.

The calculation circuit 206 may be coupled to a look-up table (LUT) 220 (or may include a LUT). The calculation circuit 206 may calculate and determine appropriate compensation values for different data values based on various factors such as the display brightness value (DBV), temperature, image loads, and frame rate. In this embodiment, the calculation circuit 206 may calculate the compensation value for the current frame F_N according to the previous frame F_(N−1) by referring to the LUT 220.

The compensation circuit 208 may receive the image data of the current frame F_N from the receiver 200 and also receive the image data of the previous frame F_(N−1) from the memory 230, and obtain the appropriate compensation values from the calculation circuit 206, to generate the output image data. In this embodiment, the compensation circuit 208 may modify the image data of the current frame F_N by using the compensation value generated based on the previous frame F_(N−1).

Figure 3:
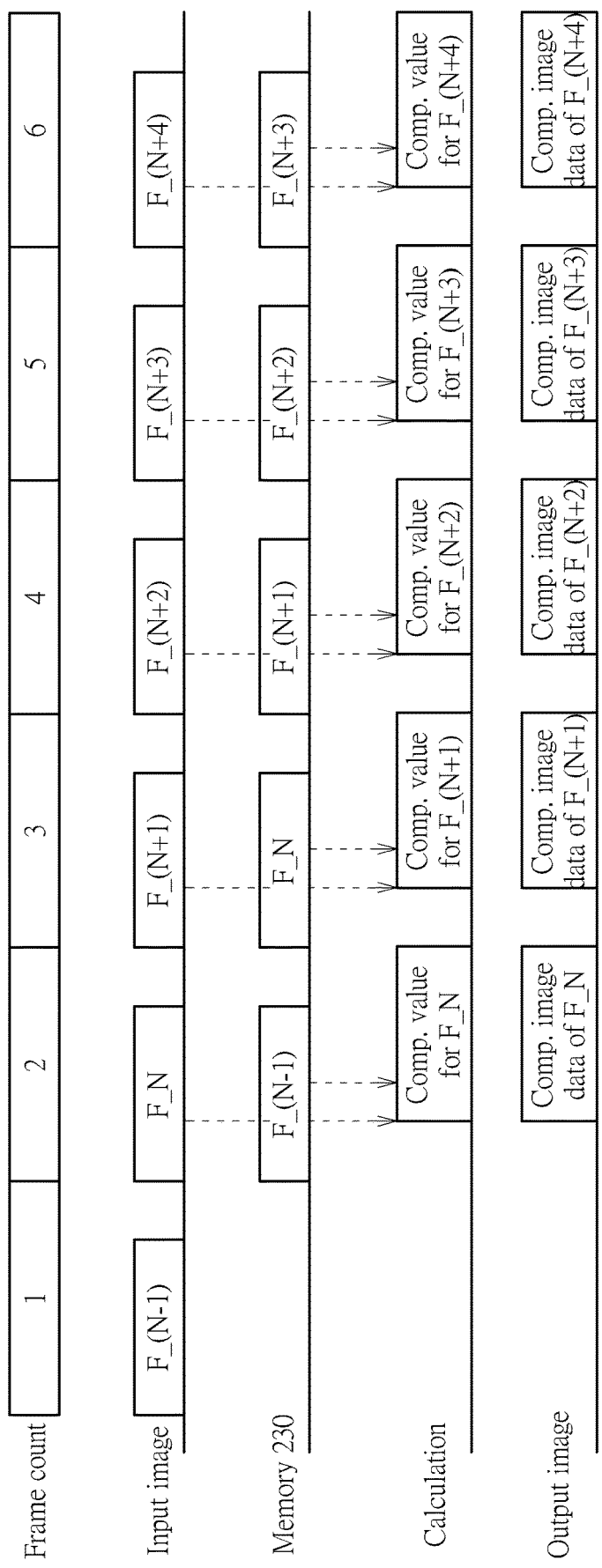
FIG. 3 is a timing diagram of the operations of the image processing circuit shown in FIG. 2.

FIG. 3 is a timing diagram of the operations of the image processing circuit 20. The frame count indicates the numbers of several consecutive frame periods in which a series of image frames are received by the image processing circuit 20. When the image data of current frames from F_N to F_(N+4) are received, the image data stored in the memory 230 are of frames from F_(N−1) to F_(N+3), respectively. The compensation circuit 208 may compare the input image data of the current frame with the image data of the previous frame stored in the memory 230 to determine whether to perform compensation with the corresponding compensation value to generate the output image data.

Figure 4:
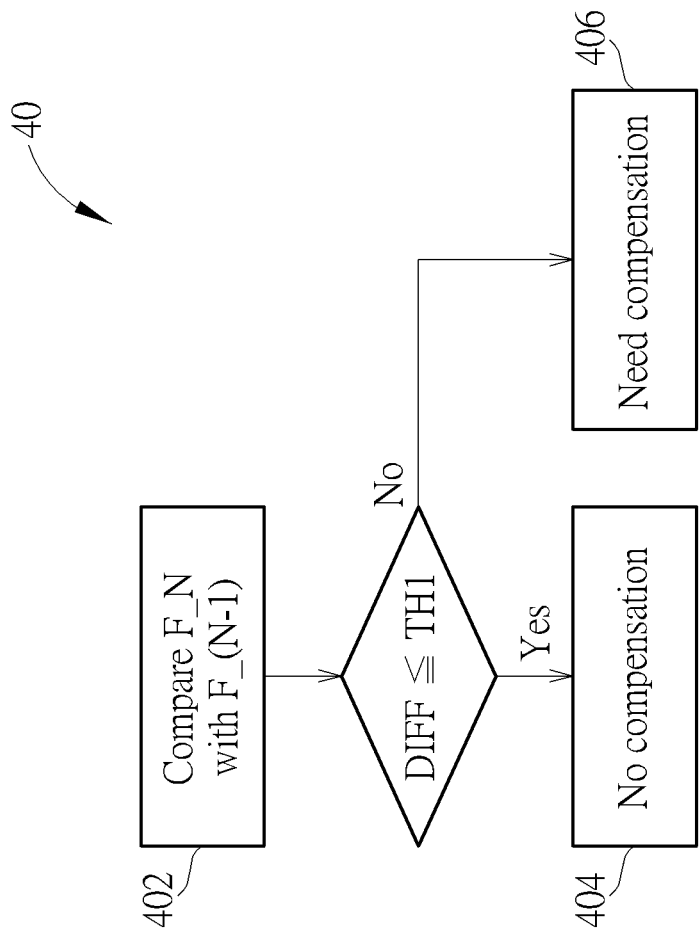
FIG. 4 is a flowchart of an image processing process for the image processing circuit shown in FIG. 2.

FIG. 4 is a flowchart of an image processing process 40 for the image processing circuit 20. As shown in FIG. 4, the compensation circuit 208 may compare the image data of the currently input frame (e.g., F_N) with the image data of the previous frame (e.g., F_(N−1)) stored in the memory (Step 402). If the comparison result indicates that the current image data and the previous image data are substantially equal or the difference between these image data is smaller than or equal to a threshold TH1, the compensation circuit 208 may determine that the compensation is not necessary and forward the currently input image data to the display panel without modification or compensation (Step 404). If the comparison result indicates that the current image data and the previous image data are quite different or the difference between these image data is greater than the threshold TH1, the compensation circuit 208 may determine that the compensation is needed and modify the currently received image data to generate the output image data (Step 406).

Note that the image processing circuit 20 performs compensation only based on one previous frame; that is, the compensation for frame F_N is based on frame F_(N−1). However, as mentioned above, the luminance drop may appear in several consecutive image frames after the grayscale changes. The compensation scheme only based on the previous frame N−1 cannot satisfy the requirement of compensating for the multi-frame luminance drop.

Figure 5:
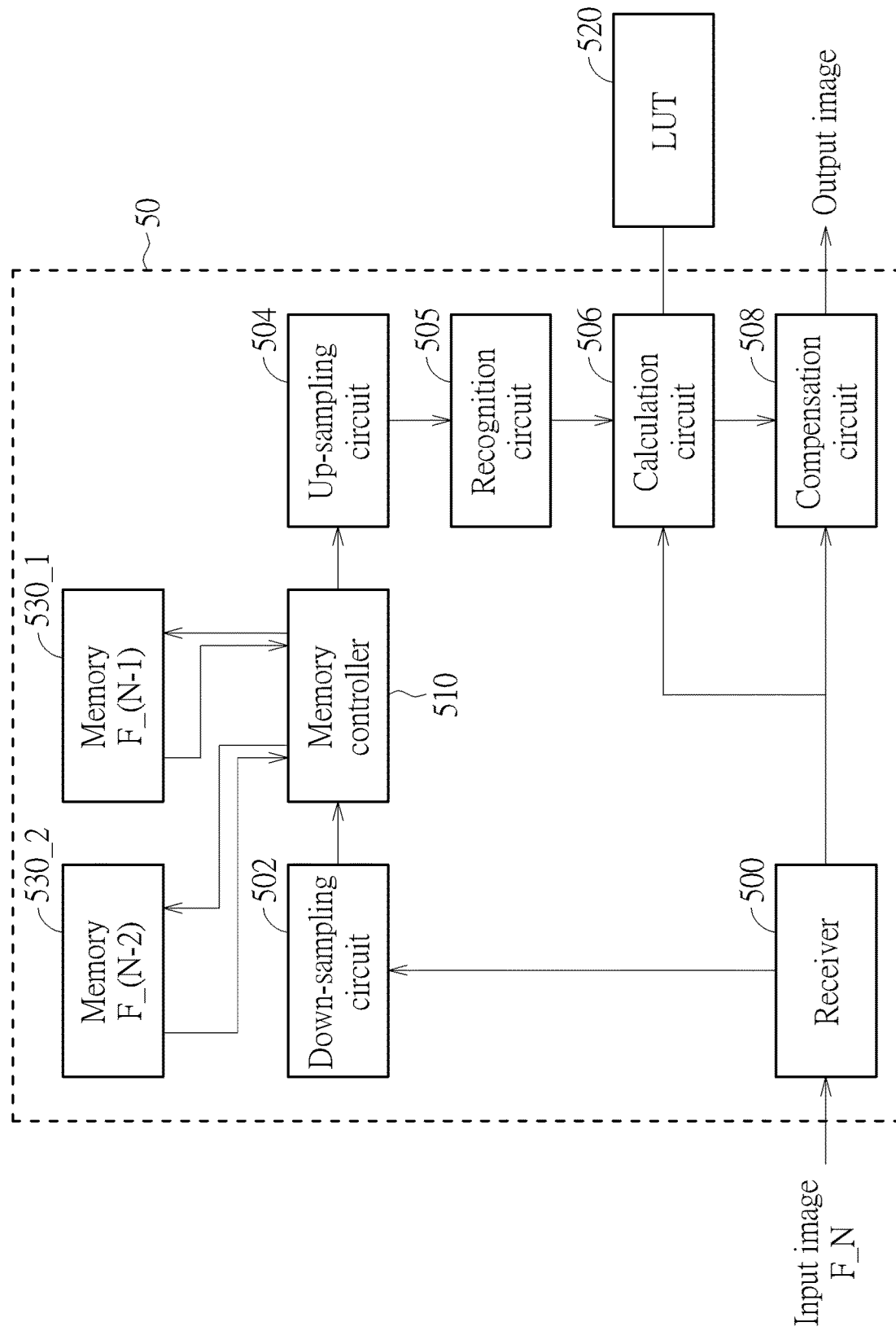
FIG. 5 is a schematic diagram of an image processing circuit according to an embodiment of the present invention.

Therefore, the present invention provides an image processing circuit capable of compensating for the multi-frame luminance drop resulting from the change of grayscale values. FIG. 5 is a schematic diagram of an image processing circuit 50 according to an embodiment of the present invention. The image processing circuit 50 includes a down-sampling circuit 502, an up-sampling circuit 504, a recognition circuit 505, a calculation circuit 506, a compensation circuit 508 and a memory controller 510. The image processing circuit 50 may further include a LUT 520 which is accessible by the calculation circuit 506, or the calculation circuit 506 of the image processing circuit 50 may be configured to be coupled to an external memory storing a LUT 520. The image processing circuit 50 may further include two memories 530_1 and 530_2 which are controlled by the memory controller 510, or the memory controller 510 of the image processing circuit 50 may be configured to be coupled to two external memories 530_1 and 530_2, where the memories 530_1 and 530_2 are used for storing the image data of two previous frames.

The operations of the down-sampling circuit 502 and the up-sampling circuit 504 are similar to the down-sampling circuit 202 and the up-sampling circuit 204 shown in FIG. 2; that is, performing compression and decompression on the stored image data, so as to save the storage space. In this embodiment, since the image processing circuit 50 includes two memories 530_1 and 530_2 that may be used for storing two previous frames such as F_(N−1) and F_(N−2), the down-sampling circuit 502 may compress the previous frames F_(N−1) and F_(N−2) before they are stored in the memories 530_1 and 530_2, and the up-sampling circuit 504 may decompress any of the previous frames F_(N−1) and F_(N−2) when they are obtained from the memories 530_1 and/or 530_2.

In the above embodiment, the memories 530_1 and 530_2 may store the image data of the previous frames F_(N−1) and F_(N−2) in a compressed form. Note that the implementation shown in FIG. 5 is merely an exemplary embodiment of the present invention. In another embodiment, the two memories 530_1 and 530_2 may be replaced by a larger memory capable of storing the information of two frames of image data, either compressed or uncompressed. Further, the down-sampling circuit 502 and/or the up-sampling circuit 504 are optional circuit modules. If the memory space is large enough to entirely store two frames of image data without down-conversion or compression, the down-sampling circuit 502 and corresponding up-sampling circuit 504 may be omitted.

Different from the image processing circuit 20 shown in FIG. 2, the image processing circuit 50 shown in FIG. 5 further includes the recognition circuit 505, which may be integrated with the up-sampling circuit 504, deployed independently, or deployed in any appropriate manner in the image processing circuit 50. The recognition circuit 505 is configured to select the first previous frame F_(N−1) or the second previous frame F_(N−2) from the memory 530_1 or 530_2. For example, the recognition circuit 505 may determine that the required compensation is based on the first previous frame F_(N−1) or the second previous frame F_(N−2), and thereby control the memory controller 510 to read out the image data of frame F_(N−1) or F_(N−2) from the corresponding memory 530_1 or 530_2.

Therefore, according to whether the required compensation is based on the first previous frame F_(N−1) or the second previous frame F_(N−2), the calculation circuit 506 may calculate the compensation value for the current frame F_N according to the previous frame F_(N−1) and/or F_(N−2) by referring to the LUT 520. The compensation circuit 508 may modify the image data of the current frame F_N by using the compensation value, or may determine not to perform compensation.

Figure 6:
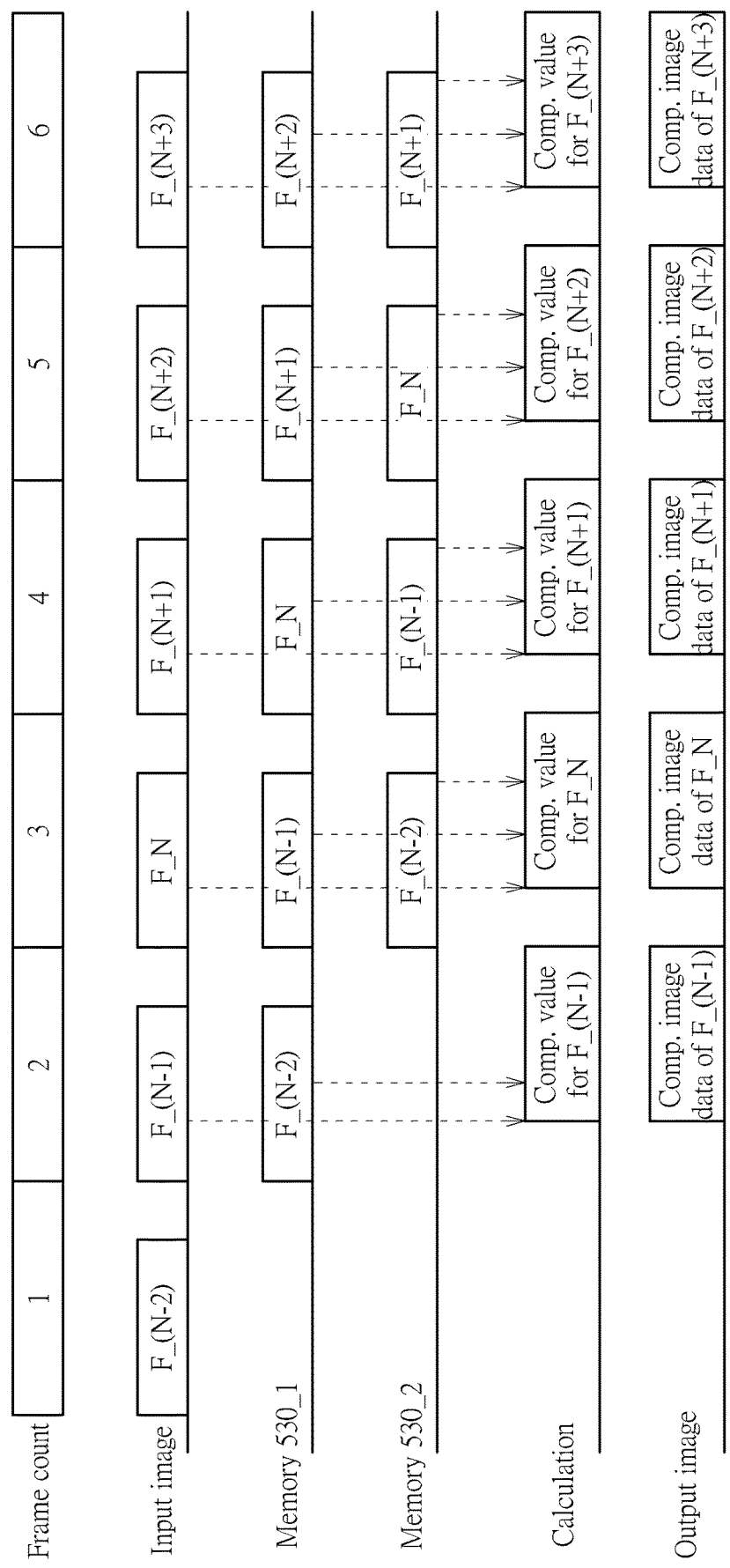
FIG. 6 is a timing diagram of the operations of the image processing circuit shown in FIG. 5.

FIG. 6 is a timing diagram of the operations of the image processing circuit 50. In this embodiment, the compensation of the current frame is performed based on two previously received image frames. For example, as for the compensation of the current frame F_N, the image processing circuit 50 may use the image data of the previous frames F_(N−1) and/or F_(N−2) for determining the compensation value and generating the output image data. The associated frames may be three consecutively received image frames, where the first previous frame F_(N−1) is previous to the current frame F_N, and the second previous frame F_(N−2) is previous to the first previous frame F_(N−1).

Figure 7:
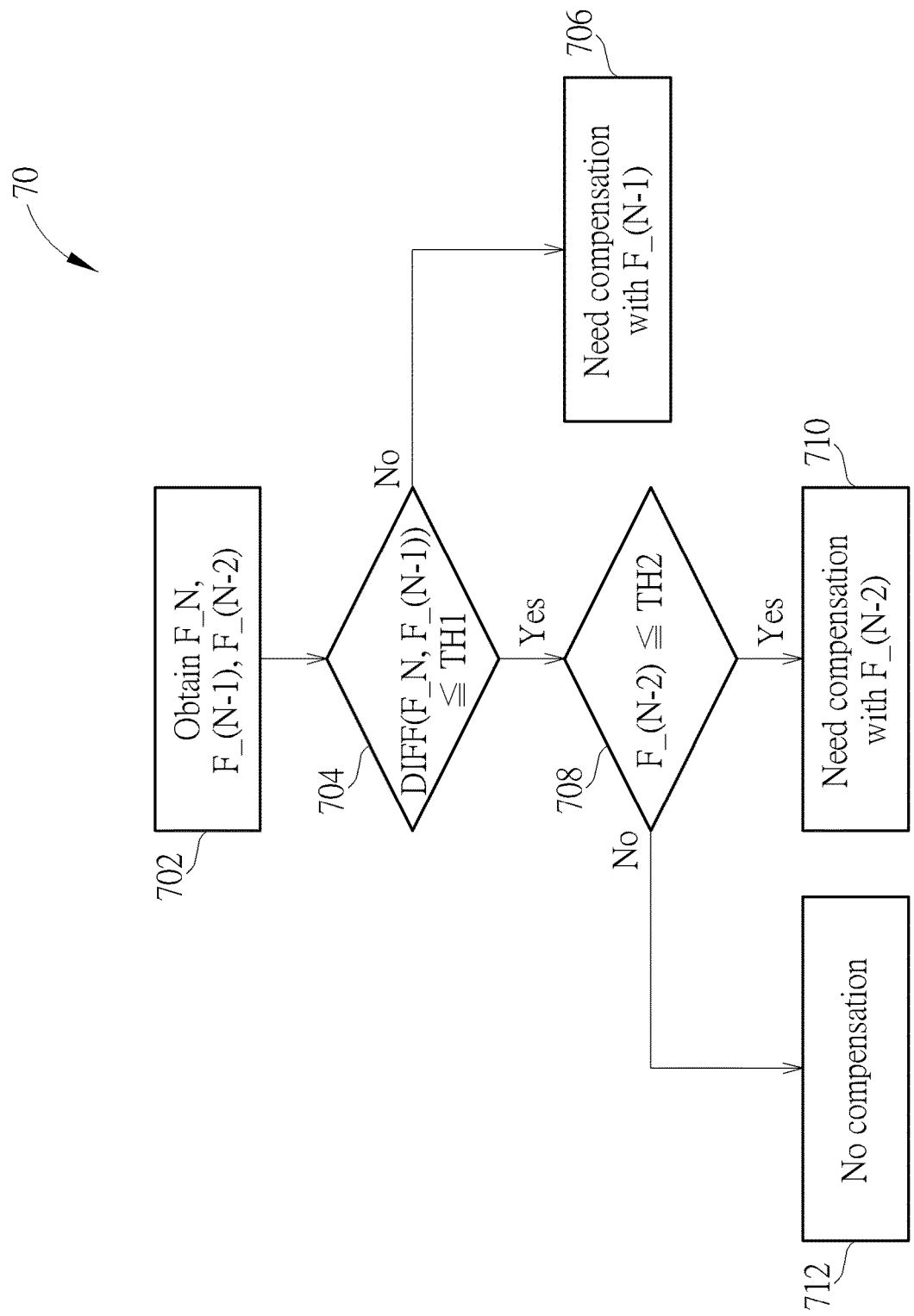
FIG. 7 is a flowchart of an image processing process according to an embodiment of the present invention.

FIG. 7 is a flowchart of an image processing process 70 according to an embodiment of the present invention. The image processing process 70 may be implemented in the image processing circuit 50 shown in FIG. 5. As shown in FIG. 7, the compensation circuit 508 may obtain the current frame (e.g., frame F_N) from the receiver 500 and the two previous frames (e.g., frames F_(N−1) and/or F_(N−2)) from the memories 530_1 and 530_2 (step 702).

Based on the current frame F_N and the two previous frames F_(N−1) and F_(N−2), the compensation circuit 508 first determines whether the image data of the current frame F_N and the image data of the first previous frame F_(N−1) are substantially equal or whether the difference of the image data of the current frame F_N and the image data of the first previous frame F_(N−1) is smaller than or equal to a threshold TH1 (step 704). If not, the compensation circuit 508 determines that the image compensation associated with the first previous frame F_(N−1) should be performed (step 706), and thus modifies the image data of the current frame F_N with a compensation value corresponding to the first previous frame F_(N−1), to generate and output the compensated image data, as similar to the implementation of the image processing process 40.

If the image data of the current frame F_N and the image data of the first previous frame F_(N−1) are determined to be identical or their difference is determined to be smaller than or equal to the threshold TH1, the compensation circuit 508 may further perform the second determination, to determine whether the image data of the second previous frame F_(N−2) is smaller than or equal to a threshold TH2 (step 708). Note that the multi-frame luminance drop usually appears when the grayscale rises sharply from an extremely low value to an extremely high value. Therefore, it is preferable to determine whether the second previous frame F_(N−2) is smaller than the threshold TH2, to determine whether to perform the image compensation associated with the second previous frame F_(N−2). Note that the thresholds TH1 and TH2 may be set to any appropriate values, which should not be used to limit the scope of the present invention.

Therefore, if the image data of the second previous frame F_(N−2) is determined to be smaller than the threshold TH2, the compensation circuit 508 may perform the image compensation associated with the second previous frame F_(N−2) (step 710); that is, the compensation circuit 508 may modify the image data of the current frame F_N with a compensation value corresponding to the second previous frame F_(N−2). Otherwise, if the image data of the previous frame F_(N−2) is determined to be greater than the threshold TH2, the compensation circuit 508 may determine that no compensation is needed (step 712), thereby outputting the image data of the current frame F_N without modification or compensation.

In general, the image compensation may be performed by modifying the grayscale data or data voltages to be output to the display driver, to control the display panel to show desired luminance, thereby solving the problem of multi-frame luminance drop. In an embodiment, the image compensation associated with the first previous frame F_(N−1) may be calculated as follows:

$$\text{Output} = \text{Input} \pm \text{Offset}'(\text{Gray}, \text{DBV}, \text{Color}). \tag{1}$$

More specifically, the output image data may be calculated by adding an offset value to or subtracting an offset value from the input image data, where the offset value may be determined according to the grayscale values (including the grayscale values of the previous frames F_(N−1) and/or F_(N−2)), DBV and/or color.

For example, the LUT 520 may record multiple offset values, each mapping to an input grayscale value (of the current frame F_N) and a previous grayscale value (of the previous frame F_(N−1) or F_(N−2)), and each of the colors, red, green and blue, has a respective table. The actual offset value may be obtained by taking the input grayscale value and the previous grayscale value as indices to access the value from an entry of the LUT 520, and sometimes the value may further be calculated through interpolation. After obtaining the offset value from the LUT 520 in consideration of the grayscale values and color, the calculation circuit 506 or the compensation circuit 508 may further modify or adjust the offset value according to the DBV. The DBV may be a parameter indicating the overall luminance of the panel, which may be automatically controlled by the system or manually adjusted by the user.

Therefore, in the image processing process 70, when the difference of the image data of the current frame F_N and the image data of the first previous frame F_(N−1) is greater than the threshold TH1, the image compensation associated with the first previous frame F_(N−1) may be performed, where the calculation circuit 506 may calculate the compensation value and the compensation circuit 508 may modify the input image data to generate the output image data by following Equation (1).

Note that the image compensation associated with the second previous frame F_(N−2) may require different degrees of compensation and may be calculated differently, as shown below:

$$\text{Output} = \alpha \times \text{Input} \pm \beta \times \text{Offset}' \pm \gamma. \quad (2)$$

The parameter Offset' is similar to the offset value stored in the LUT 520 as described above, where the offset value in this embodiment is obtained by referring to the image data of the current frame F_N and the image data of the second previous frame F_(N−2). The parameter $\alpha$ is a scalar coefficient for the input image data, the parameter $\beta$ is a scalar coefficient for the offset value Offset', and the parameter $\gamma$ is a correction coefficient for correcting the offset value Offset'.

The value of each parameter $\alpha$, $\beta$ and $\gamma$ may be determined according to the grayscale value, DBV and color of image frames F_N, F_(N−1) and/or F_(N−2), so as to appropriately adjust the input image data to generate the output image data under various situations. In the embodiments of the present invention, the parameters $\alpha$, $\beta$ and $\gamma$ may be selectively applied to calculate the output image data. For example, in an embodiment, the parameter $\alpha$ may be equal to 1 and the parameter $\gamma$ may be equal to 0, while the offset value may be modified by adjusting the scalar parameter $\beta$. In another embodiment, all of the parameters $\alpha$, $\beta$ and $\gamma$ may be set to appropriate values to adjust the input image data and generate the output image data.

In a practical embodiment, the luminance drop may appear in several consecutive image frames having the same grayscale, and the degree of luminance drop may gradually decrease in these image frames. Therefore, the image compensation associated with the first previous frame should provide the maximum compensation value, the image compensation associated with the second previous frame may provide a smaller compensation value, the compensation value for the image compensation associated with the third previous frame may further be smaller, and so on. These compensation values may be associated with each other, and thus each compensation value may be calculated by using appropriate parameters based on another compensation value. For example, the input image frame right after grayscale change may be compensated with 100 units of luminance, the next image frame may be compensated with 80 units of luminance, and 60 units of luminance for the next one.

Therefore, in the image processing process 70, when the difference of the image data of the current frame F_N and the image data of the first previous frame F_(N−1) is smaller than or equal to the threshold TH1 and the image data of the second previous frame F_(N−2) is smaller than or equal to the threshold TH2, the image compensation associated with the second previous frame F_(N−2) may be performed, where the calculation circuit 506 may calculate the compensation value and the compensation circuit 508 may modify the input image data to generate the output image data by following Equation (2).

Figure 8:
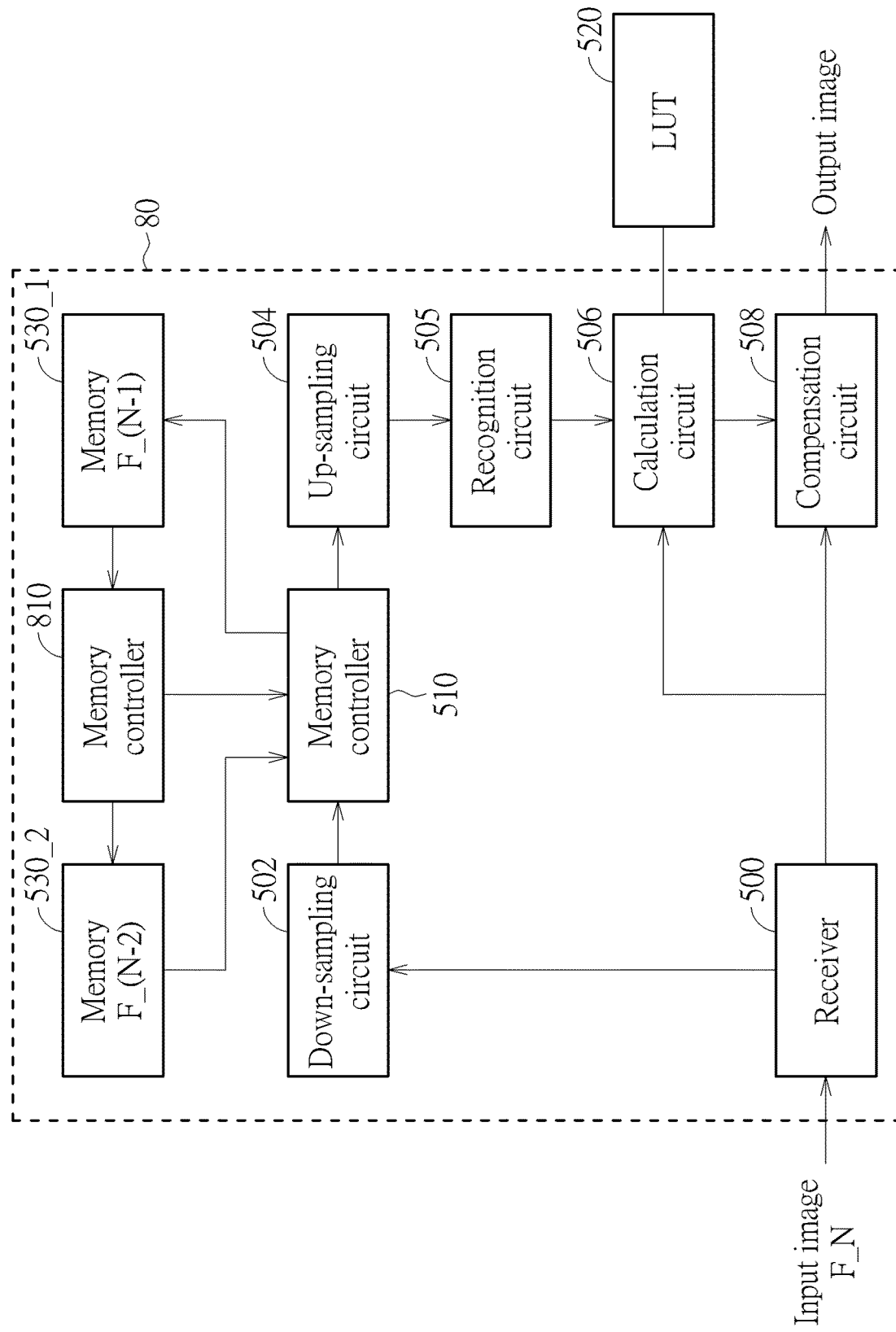
FIG. 8 is a schematic diagram of another image processing circuit according to an embodiment of the present invention.

FIG. 8 is a schematic diagram of another image processing circuit 80 according to an embodiment of the present invention. The structure of the image processing circuit 80 is similar to the structure of the image processing circuit 50, so signals and elements having similar functions are denoted by the same symbols. The difference between the image processing circuit 80 and the image processing circuit 50 is that, the image processing circuit 80 includes another memory controller 810 used for processing the frame data to be written into the memory 530_2.

In an embodiment, suppose that the image data of the frame F_(N−1) is stored in the memory 530_1 and the image data of the frame F_(N−2) is stored in the memory 530_2. In the next frame period, the image data of the frame F_(N−1) may be forwarded to the memory 530_2, the memory 530_1 receives the image data of the frame F_N from the receiver 500, and the newly arrived image frame is frame F_(N+1). The memory controller 810, which is coupled between the memories 530_1 and 530_2, may obtain the image frame F_(N−1) from the memory 530_1, extract the feature(s) of the image frame F_(N−1), and store the information associated with the feature (s) into the memory 530_2 as another previous frame for the usage of the next frame period. In such a situation, the data amount stored in the memory 530_2 may be less than the data amount stored in the memory 530_1, so that the usage of memory space and the overall data throughput may further be saved.

Referring back to FIG. 7, the determination associated with the second previous frame stored in the memory 530_2 is whether the image data of the second previous frame is smaller than or equal to the threshold TH2. In such a situation, the image data stored in the memory 530_2 may not need to contain the entire frame data or compressed data; instead, the memory 530_2 may store significantly simplified information as long as the required determination may be performed successfully. For example, the stored information or data may be representative to the grayscale values of one or several areas that contain specific features to be used to achieve accurate determination. In this embodiment, the storage space of the memory 530_2 may be reduced, thereby reducing the circuit costs of the image processing circuit 80.

Note that the above embodiments illustrate that the compensation is performed to solve the problem of luminance drop in two consecutive image frames. Those skilled in the art should understand that similar implementations are applicable to more than two image frames. An exemplary implementation is shown in FIG. 9, which is a schematic diagram of an image processing circuit 90 according to an embodiment of the present invention.

Figure 9:
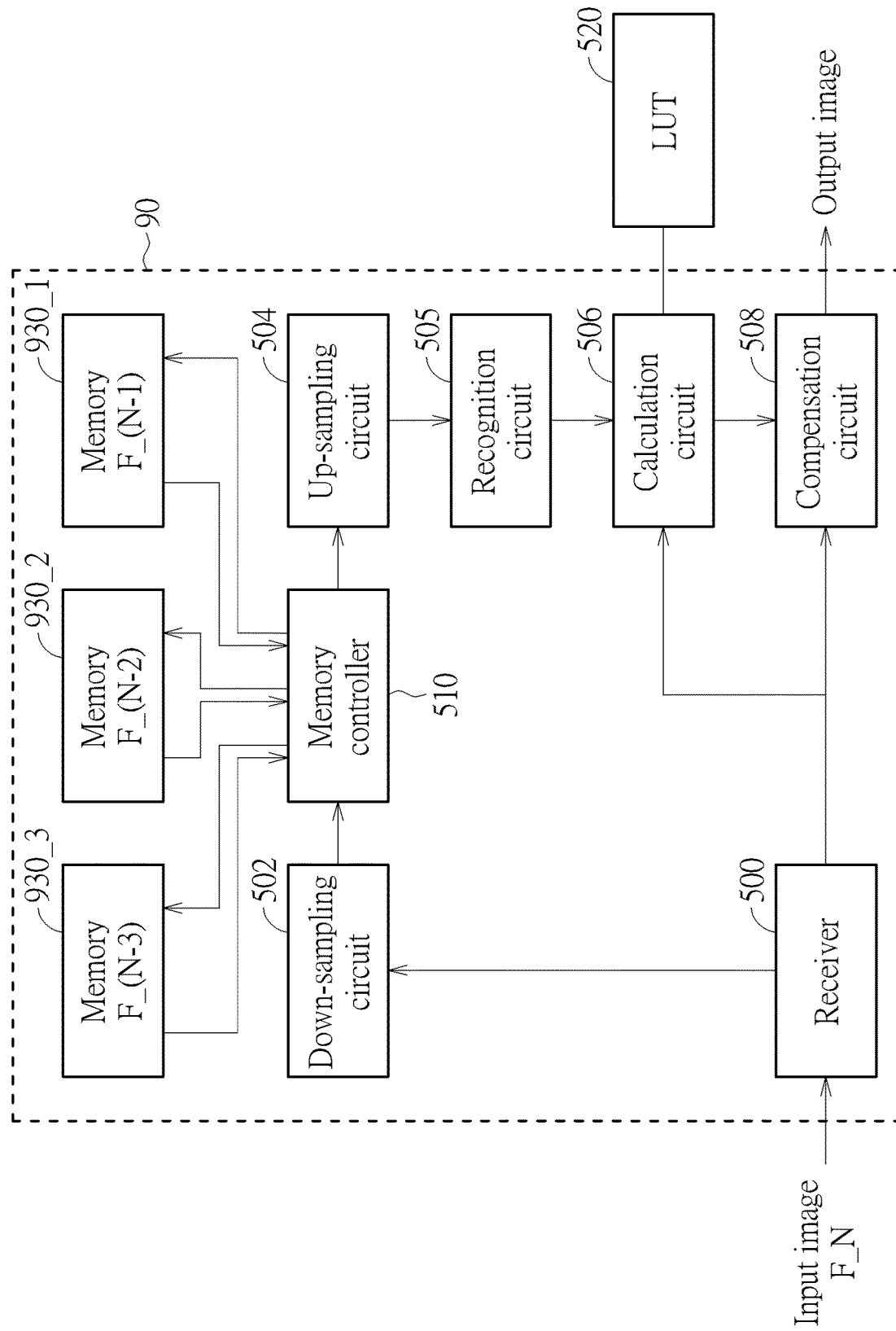
FIG. 9 is a schematic diagram of a further image processing circuit according to an embodiment of the present invention.

As shown in FIG. 9, the structure of the image processing circuit 90 is similar to the structure of the image processing circuit 50, so signals and elements having similar functions are denoted by the same symbols. The difference between the image processing circuit 90 and the image processing circuit 50 is that, the image processing circuit 90 includes three memories 930_1, 930_2 and 930_3 for storing the (compressed or uncompressed) image data and/or related information of three previous frames F_(N−1), F_(N−2) and F_(N−3), respectively.

Figure 10:
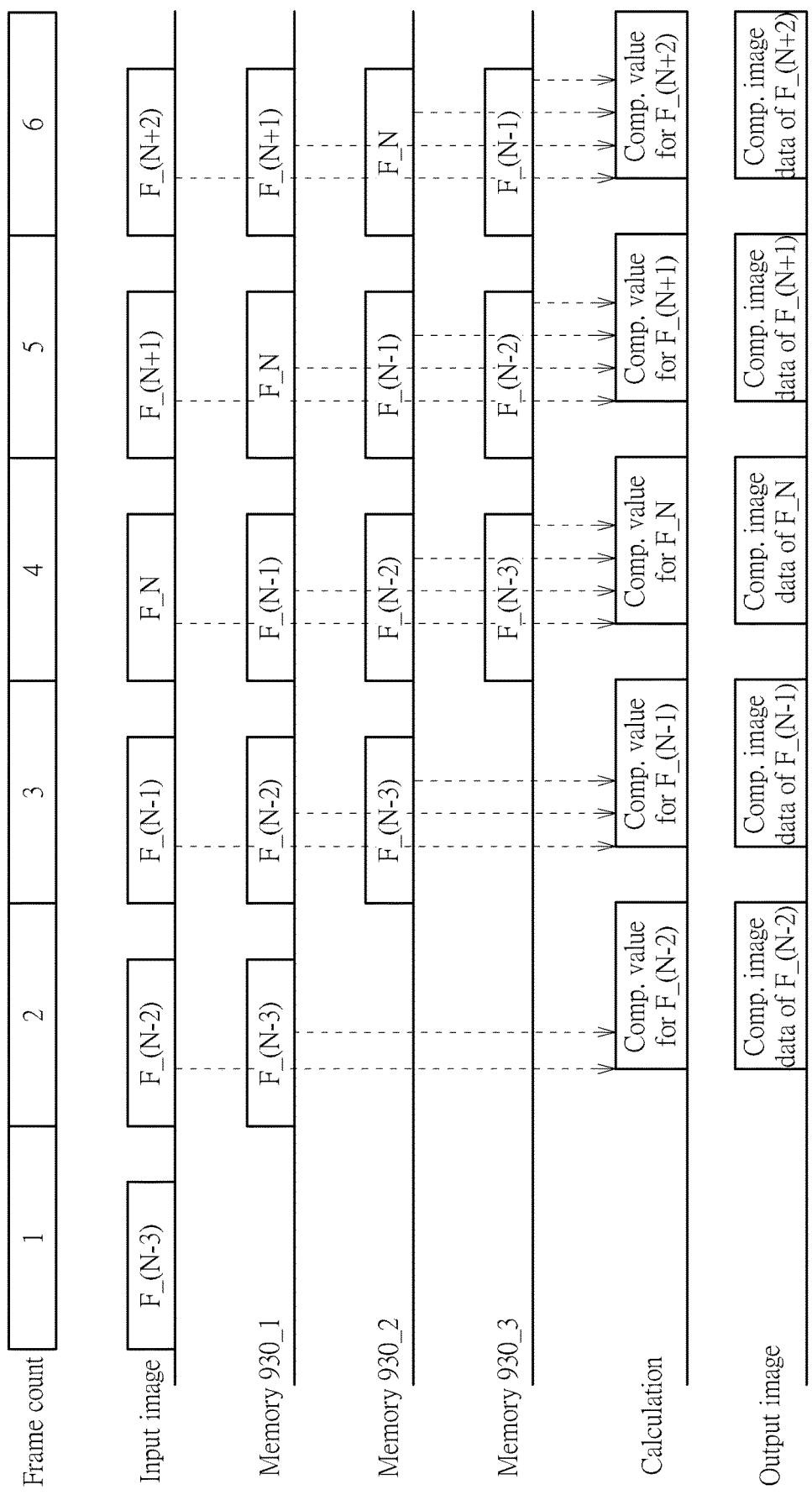
FIG. 10 is a timing diagram of the operations of the image processing circuit shown in FIG. 9.

The timing diagram related to the image processing circuit 90 is shown in FIG. 10, where the image data of the previous frame F_(N−3) is written into the memory 930_3 when the image data of the current frame F_N is received in the fourth frame period (i.e., frame count 4). One of ordinary skill in the art may infer the operations of the image processing circuit 90 according to the above descriptions, which will not be detailed herein.

Figure 11:
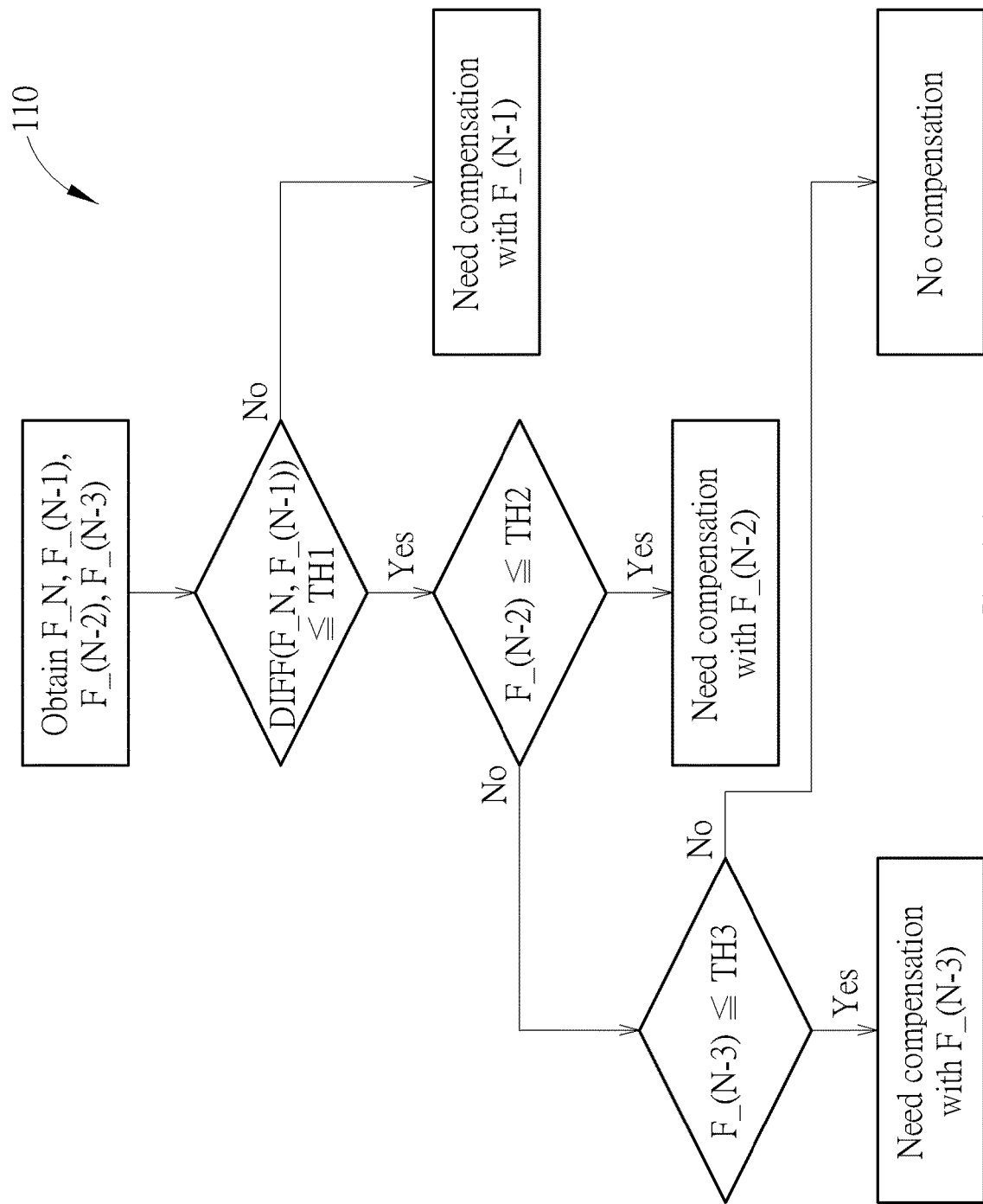
FIG. 11 is a flowchart of an image processing process according to an embodiment of the present invention.

FIG. 11 is a flowchart of an image processing process 110 according to an embodiment of the present invention. The image processing process 110 may be implemented in the image processing circuit 90 shown in FIG. 9. In this embodiment, the first determination associated with the first previous frame and the second determination associated with the second previous frame are similar to the image processing process 70, and the image processing process 110 further performs the third determination associated with the third previous frame, i.e., the previous frame F_(N−3) stored in the memory 930_3. For example, the compensation circuit 508 of the image processing circuit 90 may determine whether the image data of the third previous frame F_(N−3) is smaller than or equal to a threshold TH3, and thereby determine whether to perform compensation associated with the third previous frame F_(N−3) based on the determination result. This compensation associated with the third previous frame F_(N−3) may also be performed by applying an offset value modified with appropriate scalars, as similar to the formulas described above.

Figure 12:
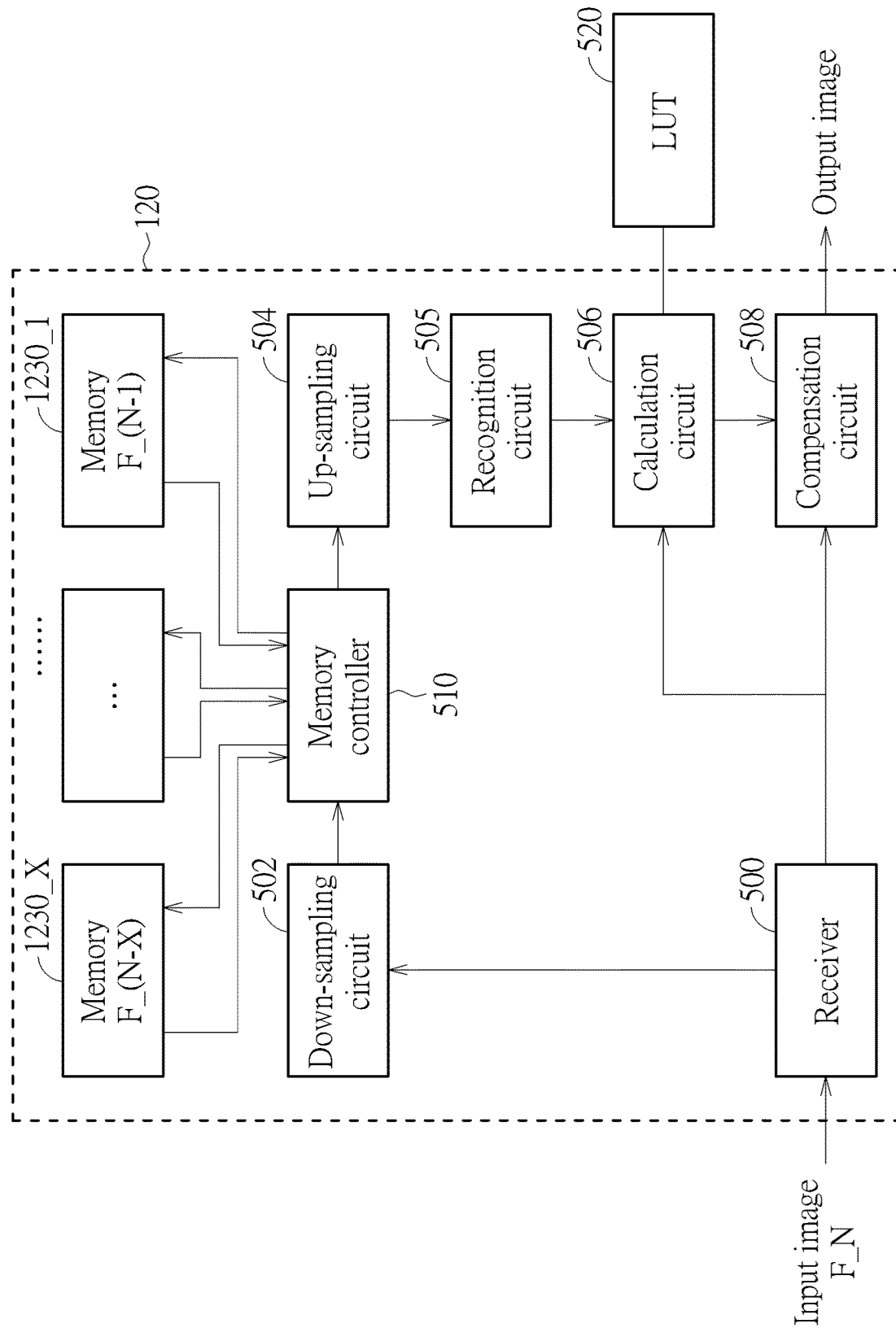
FIG. 12 is a schematic diagram of an image processing circuit according to an embodiment of the present invention.

By the same token, the implementations and operations may be extended to any number of image frames, to compensate for the luminance drop in more consecutive frames. As shown in FIG. 12, there are X memories 1230_1-1230_X included in the image processing circuit 120 for storing X previous frames from F_(N−1) to F_(N−X); hence, the compensation is performed based on X previous frames, where X may be any integer greater than 1 and smaller than N. Other circuits or modules included in the image processing circuit 120 are similar to those in the above embodiments, which are denoted by the same symbols, and their operations are omitted herein for brevity.

In another embodiment, the image processing circuit 120 may include a larger memory which is capable of storing the image data (or related information) of X image frames instead of X smaller memories 1230_1-1230_X. The related implementations are similar to those described above, and will be omitted herein.

Note that the present invention aims at providing a novel image processing circuit and method capable of compensating for the luminance drop in multiple consecutive frames. Those skilled in the art may make modifications and alterations accordingly. For example, in the above embodiments, the compensation for luminance may be performed by modifying or adjusting the image data such as the grayscale data of the image. Since the grayscale data has to be converted into data voltages used for driving the panel to display, it is also feasible to compensate for the data voltages to control the output luminance to reach its target level. In other words, the compensation scheme is applicable to both the data domain and the voltage domain, where the data values or voltage values may be modified to achieve desired luminance.

In an embodiment, the image processing circuit may be integrated with the display driver integrated circuit (DDIC) to process the image data or data voltages in hardware circuitry. Alternatively, the image processing circuit may be implemented as an algorithm performed in an application processor (AP) or central processing unit (CPU), but not limited thereto. The image processing circuit is applicable to any type of display panel, which includes, but not limited to, an organic light emitting diode (OLED) panel, mini-OLED panel, and micro-OLED panel.

In addition, the image data of a previous frame used for comparison or the image data of the current frame to be compensated may be the image data of an entire frame, a block, a pixel or a subpixel. In an embodiment, each pixel of an image frame may be provided with the same grayscale and thus have the same image data, which may be applied to perform determination and/or compensation during the process of compensating for the luminance drop. In another embodiment, the image data of a pixel is applied to determine whether the compensation should be performed and which type of compensation (i.e., the compensation associated with which previous frame) is to be performed, and the luminance compensation may be performed on this pixel. Alternatively, several image data in an area or block may be commonly considered in order to perform the same compensation on the area or block.

Figure 13A:
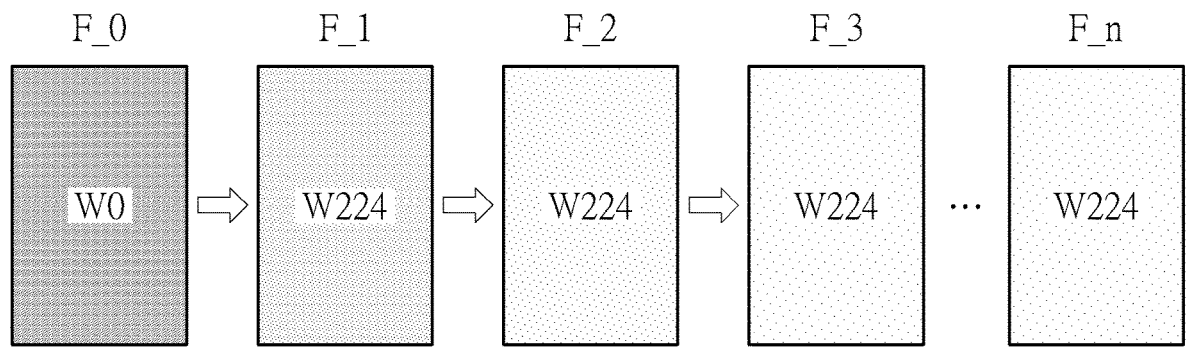
FIG. 13A illustrates the luminance of a series of image frames without luminance drop compensation.
Figure 13B:
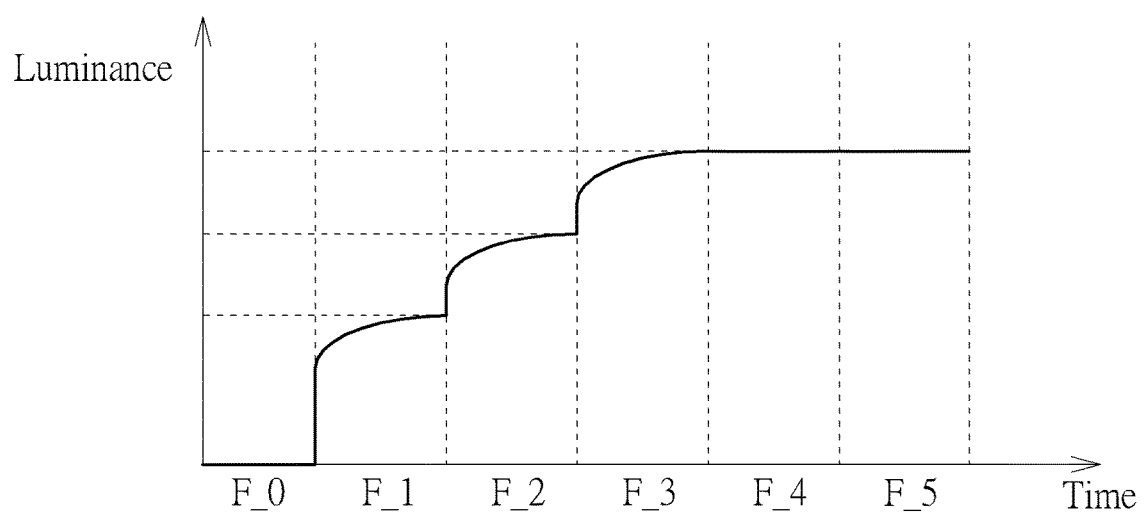
FIG. 13B illustrates the waveform of the luminance measured on the display panel without luminance drop compensation.

According to the embodiments of the present invention, the luminance drop in multiple image frames after grayscale change may be solved. FIG. 13A illustrates an exemplary implementation where the grayscale changes from W0 in frame F_0 to W224 in frame F_1 and then keeps at W224 for several frame periods (frames F_2-F_n). As shown in FIG. 13A, the luminance cannot reach its target level corresponding to the grayscale W224 in the frames F_1 and F_2. FIG. 13B illustrates the waveform of the luminance measured on the display panel, which shows that it needs several frame periods to make the luminance reach its target level. This case shows the behavior of a display panel during power-on without luminance drop compensation.

Figure 14A:
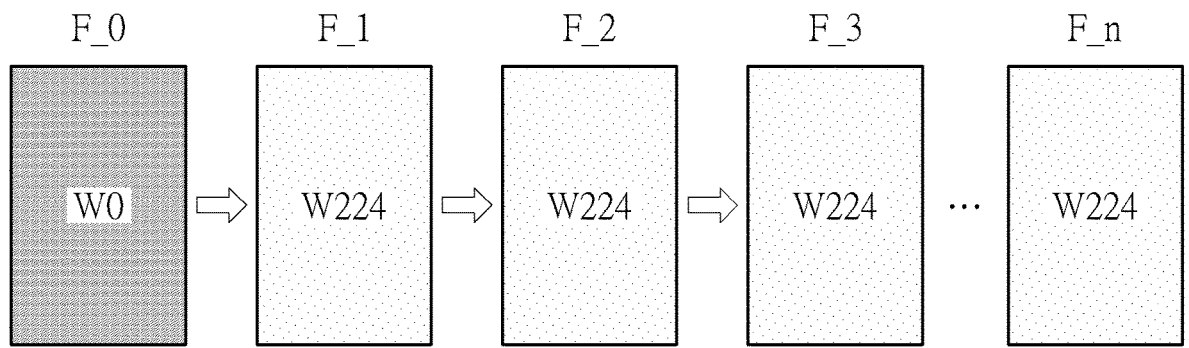
FIG. 14A illustrates the luminance of a series of image frames after luminance drop compensation.
Figure 14B:
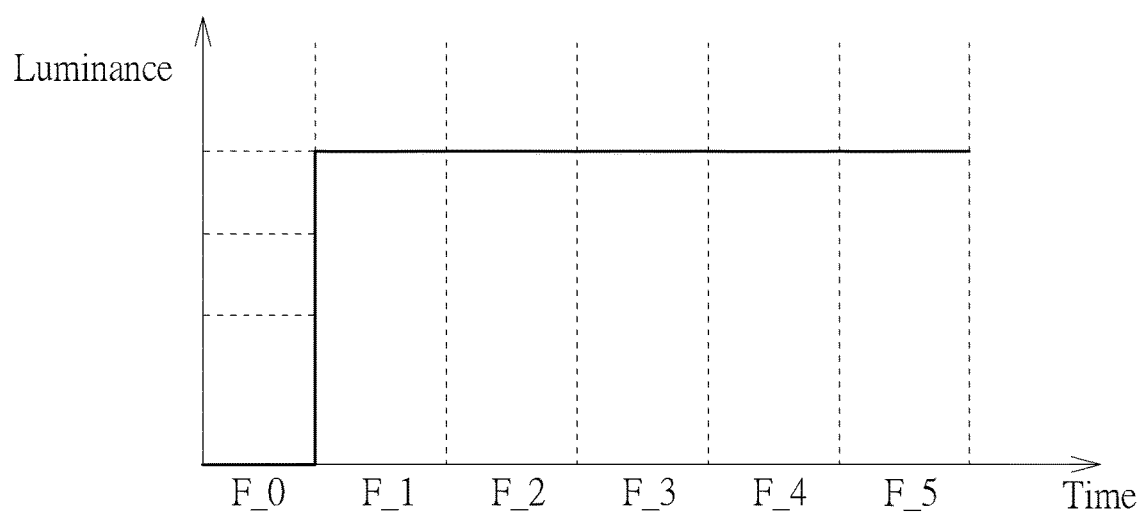
FIG. 14B illustrates the waveform of the luminance measured on the display panel after luminance drop compensation.

If the compensation scheme of the present invention is applied, the multi-frame luminance drop may be well compensated. Since the luminance without compensation rises gradually after the grayscale value changes to W224, the compensation value may have the maximum level in the frame F_1 and then gradually decrease, so that the luminance may become uniform throughout these frame periods. For example, as shown in FIG. 14A, starting from the frame F_1, the luminance reaches the target level corresponding to the grayscale W224 and keeps at the same level for multiple frames, and the measured luminance keeps constant in these frames, as shown in FIG. 14B.

Note that the grayscale variation from W0 to W224 as shown in the above embodiment is merely an example. The image compensation of multi-frame luminance drop provided in the present invention is applicable to any scenarios where the grayscale changes sharply. For example, the image processing circuit may receive the image data of at least three image frames (e.g., including F_(N−2), F_(N−1) and F_N) in sequence, the image data of the frame F_(N−2) may have a first grayscale value which may correspond to low luminance, and the image data of the frames F_(N−1)

and F_N may have a second grayscale value which is greater than the image data of the frame F_(N−2) and may correspond to high luminance. The change from the first grayscale value to the second grayscale value results in a multi-frame luminance drop appearing in at least the frames F_(N−1) and F_N. After the image data of the frames F_(N−1) and F_N are modified through luminance compensation, the image processing circuit may output the same luminance for the frames F_(N−1) and F_N. If the grayscale value keeps unchanged in several consecutive image frames, the luminance will also keep constant throughout these image frames by using appropriate compensation methods proposed in the present invention.

As a result, with the compensation scheme of the present invention, the problem of multi-frame luminance drop may be solved, where the luminance of the display image may reach the desired level after the grayscale changes, so as to solve the image sticking problem and improve the visual effects. If the display image after luminance compensation is used for emission of fingerprint sensing, the performance of fingerprint sensing may also be improved.

Figure 15:
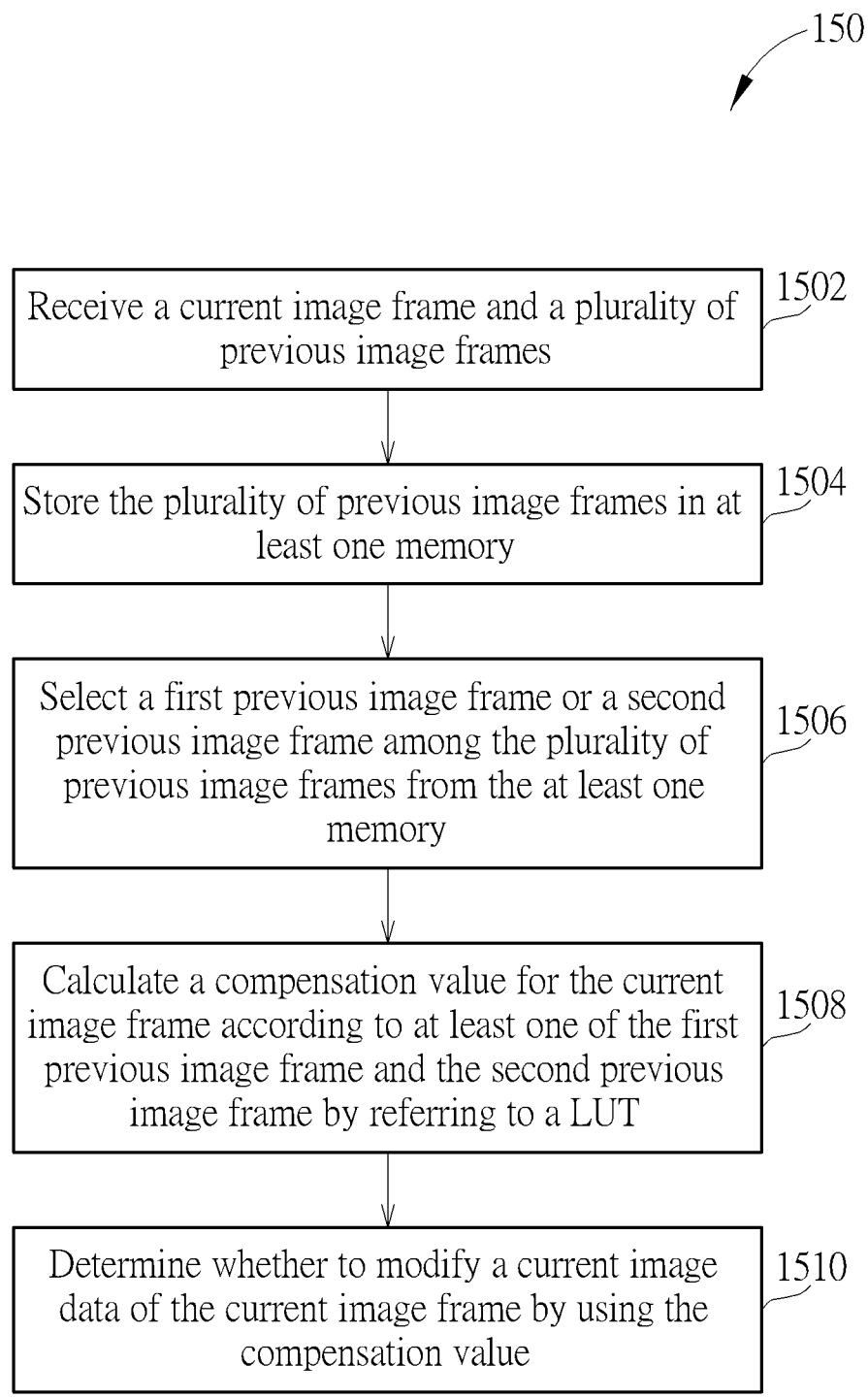
FIG. 15 is a flowchart of an image processing process according to an embodiment of the present invention.

The abovementioned operations of the image processing circuit may be summarized into an image processing process 150, as shown in FIG. 15. The image processing process 150 may be implemented in any of the image processing circuits 20, 50, 80, 90 and 120, to compensate for the multi-frame luminance drop. As shown in FIG. 15, the image processing process 150 includes the following steps:

Step 1502: Receive a current image frame and a plurality of previous image frames.

Step 1504: Store the plurality of previous image frames in at least one memory.

Step 1506: Select a first previous image frame or a second previous image frame among the plurality of previous image frames from the at least one memory.

Step 1508: Calculate a compensation value for the current image frame according to at least one of the first previous image frame and the second previous image frame by referring to a LUT.

Step 1510: Determine whether to modify a current image data of the current image frame by using the compensation value.

The detailed operations and alterations of the image processing process 150 are illustrated in the above paragraphs, and will not be narrated herein.

To sum up, the present invention provides an image processing circuit and method capable of compensating for the luminance drop in several consecutive frames. The compensation may be performed by referring to a LUT which records the related compensation values. Different from the conventional compensation scheme where the image compensation is performed based on only one previous frame, in the present invention, the image compensation of the current frame is performed based on multiple previous frames. When a currently input image frame is received, the image processing circuit may perform comparison using a first previous frame to determine whether to perform the image compensation associated with the first previous frame. Based on the above comparison result, the image processing circuit may then perform comparison using a second previous frame to determine whether to perform the image compensation associated with the second previous frame. By the same token, the image processing circuit may then perform comparison using the N-th previous frame to determine whether to perform the image compensation associated with the N-th previous frame, so as to realize the multi-frame luminance drop compensation.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An image processing circuit, comprising:
   a receiver, configured to receive a current image frame and a plurality of previous image frames;
   at least one memory, coupled to the receiver, configured to store the plurality of previous image frames;
   a recognition circuit, coupled to the at least one memory, configured to select a first previous image frame or a second previous image frame among the plurality of previous image frames from the at least one memory;
   a calculation circuit, coupled to the recognition circuit, configured to calculate a compensation value for the current image frame according to at least one of the first previous image frame and the second previous image frame by referring to a lookup table (LUT); and
   a compensation circuit, coupled to the calculation circuit, configured to modify a current image data of the current image frame by using the compensation value according to a first determination result of the first previous image frame and a second determination result of the second previous image frame without changing a resolution of the current image data, wherein the second previous image frame is different from the first previous image frame.

2. The image processing circuit of claim 1, further comprising:
   a down-sampling circuit, coupled to the receiver and the at least one memory, configured to compress the plurality of previous image frames before the plurality of previous image frames are stored in the at least one memory; and
   an up-sampling circuit, coupled to the recognition circuit and the at least one memory, configured to decompress at least one of the first previous image frame and the second previous image frame when the at least one of the first previous image frame and the second previous image frame is obtained from the at least one memory.

3. The image processing circuit of claim 1, wherein the first previous image frame is previous to the current image frame, and the second previous image frame is previous to the first previous image frame.

4. The image processing circuit of claim 1, wherein the compensation circuit is configured to determine whether the difference of a first image data of the first previous image frame and the current image data of the current image frame is smaller than or equal to a first threshold.

5. The image processing circuit of claim 4, wherein the compensation circuit is configured to modify the current image data with a first compensation value corresponding to the first previous image frame when determining that the difference of the first image data and the current image data is greater than the first threshold.

6. The image processing circuit of claim 4, wherein the compensation circuit is further configured to determine whether a second image data of the second previous image frame is smaller than or equal to a second threshold.

7. The image processing circuit of claim 6, wherein the compensation circuit determines whether the second image data is smaller than or equal to the second threshold when determining that the difference of the first image data and the current image data is smaller than or equal to the first threshold.

8. The image processing circuit of claim 6, wherein the compensation circuit is configured to modify the current image data with a second compensation value corresponding to the second previous image frame when determining that the second image data is smaller than or equal to the second threshold.

9. The image processing circuit of claim 8, wherein the second compensation value is calculated according to at least one of a display brightness value, a color, a grayscale value of the first previous image frame, and a grayscale value of the second previous image frame.

10. The image processing circuit of claim 8, wherein the second compensation value comprises at least one of a scalar coefficient for the current image data, a scalar coefficient for an offset value stored in the LUT, and a correction coefficient.

11. The image processing circuit of claim 6, wherein the compensation circuit is configured to output the current image data without modification when determining that the second image data is greater than the second threshold.

12. The image processing circuit of claim 1, further comprising:
a memory controller, configured to obtain the first previous image frame from a first memory among the at least one memory, extract a feature of the first previous image frame, and store the feature into a second memory among the at least one memory.

13. The image processing circuit of claim 1, wherein the image processing circuit is configured to receive a second image data of the second previous image frame, a first image data of the first previous image frame, and the current image data of the current image frame in sequence, and the second image data has a first grayscale value and the current image data and the first image data have a second grayscale value greater than the first grayscale value, and the image processing circuit outputs the same luminance for the first previous image frame and the current image frame after the current image data is modified by the compensation circuit.

14. An image processing method, comprising:
receiving a current image frame and a plurality of previous image frames;
storing the plurality of previous image frames in at least one memory;
selecting a first previous image frame or a second previous image frame among the plurality of previous image frames from the at least one memory;
calculating a compensation value for the current image frame according to at least one of the first previous image frame and the second previous image frame by referring to a lookup table (LUT); and
determining whether to modify a current image data of the current image frame by using the compensation value according to a first determination result of the first previous image frame and a second determination result of the second previous image frame without changing a resolution of the current image data, wherein the second previous image frame is different from the first previous image frame.

15. The image processing method of claim 14, further comprising:
compressing the plurality of previous image frames before the plurality of previous image frames are stored in the at least one memory; and
decompressing at least one of the first previous image frame and the second previous image frame when the at least one of the first previous image frame and the second previous image frame is obtained from the at least one memory.

16. The image processing method of claim 14, wherein the first previous image frame is previous to the current image frame, and the second previous image frame is previous to the first previous image frame.

17. The image processing method of claim 14, further comprising:
determining whether the difference of a first image data of the first previous image frame and the current image data of the current image frame is smaller than or equal to a first threshold.

18. The image processing method of claim 17, wherein the step of determining whether to modify the current image data comprises:
modifying the current image data with a first compensation value corresponding to the first previous image frame when determining that the difference of the first image data and the current image data is greater than the first threshold.

19. The image processing method of claim 17, further comprising:
determining whether a second image data of the second previous image frame is smaller than or equal to a second threshold.

20. The image processing method of claim 19, wherein the step of determining whether the second image data is smaller than or equal to the second threshold is performed when the difference of the first image data and the current image data is determined to be smaller than or equal to the first threshold.

21. The image processing method of claim 19, wherein the step of determining whether to modify the current image data comprises:
modifying the current image data with a second compensation value corresponding to the second previous image frame when determining that the second image data is smaller than or equal to the second threshold.

22. The image processing method of claim 21, wherein the second compensation value is calculated according to at least one of a display brightness value, a color, a grayscale value of the first previous image frame, and a grayscale value of the second previous image frame.

23. The image processing method of claim 21, wherein the second compensation value comprises at least one of a scalar coefficient for the current image data, a scalar coefficient for an offset value stored in the LUT, and a correction coefficient.

24. The image processing method of claim 19, wherein the step of determining whether to modify the current image data comprises:
outputting the current image data without modification when determining that the second image data is greater than the second threshold.

25. The image processing method of claim 14, further comprising:
obtaining the first previous image frame from a first memory among the at least one memory;
extracting a feature of the first previous image frame; and
storing the feature into a second memory among the at least one memory.

26. The image processing method of claim 14, wherein a second image data of the second previous image frame, a first image data of the first previous image frame, and the current image data of the current image frame are received in sequence, and the second image data has a first grayscale value and the current image data and the first image data have a second grayscale value greater than the first grayscale value, and the image processing method further comprises:

outputting the same luminance for the first previous image frame and the current image frame after the current image data is modified through compensation.

* * * * *